Dec. 16, 1969   G. L. GUINOT   3,484,005
EARTH WORKING MACHINE

Filed April 24, 1967   2 Sheets-Sheet 1

INVENTOR
GABRIEL L. GUINOT
BY
Mason, Fenwick & Lawrence
ATTORNEYS

United States Patent Office 3,484,005
Patented Dec. 16, 1969

3,484,005
EARTH WORKING MACHINE
Gabriel L. Guinot, Le Plessis-Belleville, Oise, France, assignor to Societe Anonyme Poclain, Le Plessis-Belleville, Oise, France
Filed Apr. 24, 1967, Ser. No. 633,206
Claims priority, application France, Apr. 28, 1966, 59,439
Int. Cl. E02f 3/75
U.S. Cl. 214—138                                  8 Claims

ABSTRACT OF THE DISCLOSURE

A single driving position 6 is situated above the driving wheel axle: a turret 7 carrying a working equipment 8 is mounted on the chassis 1; a loading equipment 9 is articulated on the chassis in the neighbourhood of the driving wheel axle, the controls for the said equipments being assembled at the single driving position for the machine.

This invention relates to a combined earth working machine and mechanical loader and has for its object to provide an improved machine of this type in which the operator can drive the machine and operate either an earth working or excavating implement or a loading implement without having to leave his seat and is afforded a clear view when carrying out any of those operations.

With the above stated object in view the combined earth working machine and mechanical loader according to the invention comprises a chassis, a pair of large diameter driving wheels at or near one end of said chassis, a pair of smaller diameter guiding wheels at or near the other end of said chassis, a loading implement mounted at the end of the chassis on which said driving wheels are mounted, an excavating or earth working implement mounted on a turret at the end of the chassis on which the guiding wheels are mounted, a power unit for driving the machine and operating said implements, an operator's seat rotatably mounted on said chassis substantially above the axle of the driving wheels, controls for driving and steering the machine and controls for operating said implements, some of said controls being disposed on one side of said seat and other of said controls being disposed on the opposite side of said seat.

In order that the invention may be more clearly understood one particular embodiment thereof will now be described by way of example with refernce to the accompanying diagrammatic drawings in which.

Figure 1:
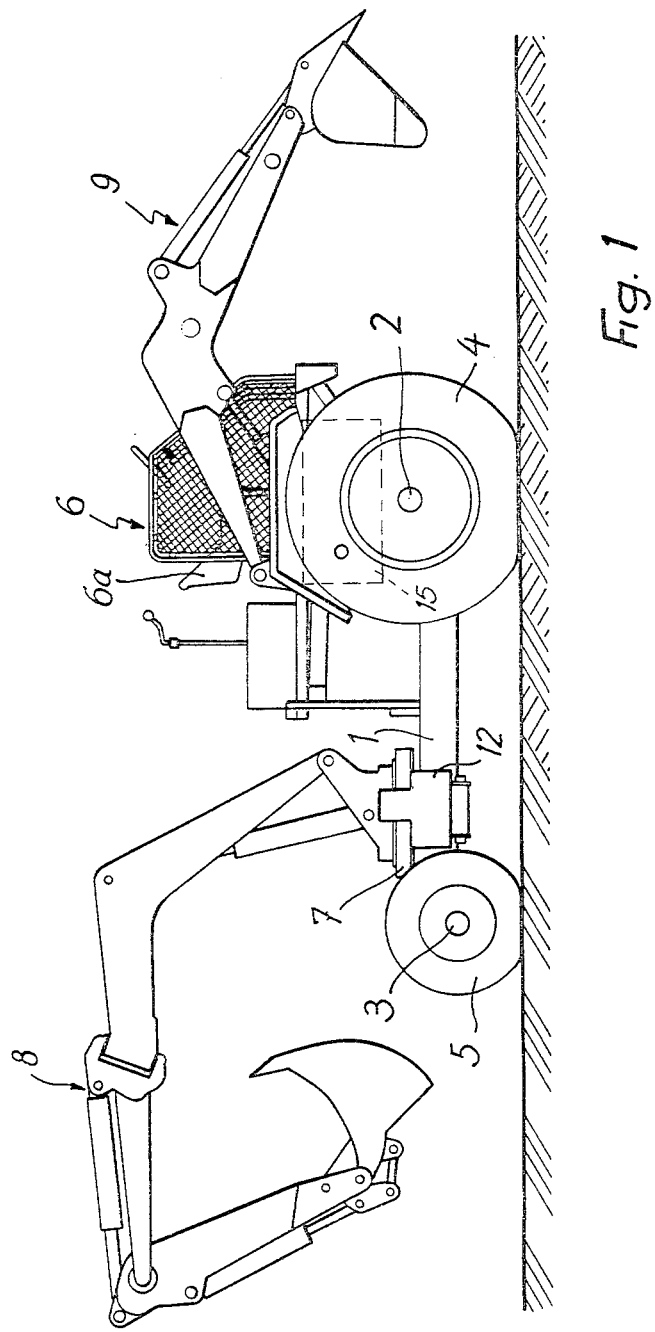
FIGURE 1 is a side elevation of the machine according to the invention.

Referring to these drawings the machine comprises a low slung chassis 1 on one end of which a pair of large diameter driving wheels 4 are mounted on an axle 2 and on the other end of which a pair of smaller diameter guiding wheels 5 are mounted on an axle 3. A power unit 15 for driving the machine and operating an earth working or excavating implement 8 and a loading implement 9 is mounted above the axle 2 of the driving wheels. The power unit need not necessarily be positioned immediately above the axle 2 but should be located as nearly above the axle 2 as possible so that the greater amount of the weight of the machine is disposed above the driving wheels 4 to ensure a good grip of the wheels on the ground. Also positioned as nearly as possible above the axle 2 is a location, indicated generally at 6, for the operator which includes an operator's seat 6a.

Mounted on the chassis 1 between the axles 2 and 3, but more closely adjacent to the guiding wheels 5, is a rotatable turret 7 which carries the earth working or excavating implement 8, in the embodiment shown an hydraulically operated shovel or scoop. At the end of the chassis on which the driving wheels 4 are mounted is articulated the loading implement 9, said implement being mounted on the chassis by means of two arms extending on opposite sides of the power unit and operator's seat 6a. The points of articulation of the implement 9 need not necessarily be as illustrated but could be positioned in front of or at the side of the seat 6a, but should be as near as possible above the axle 2.

Figure 2:
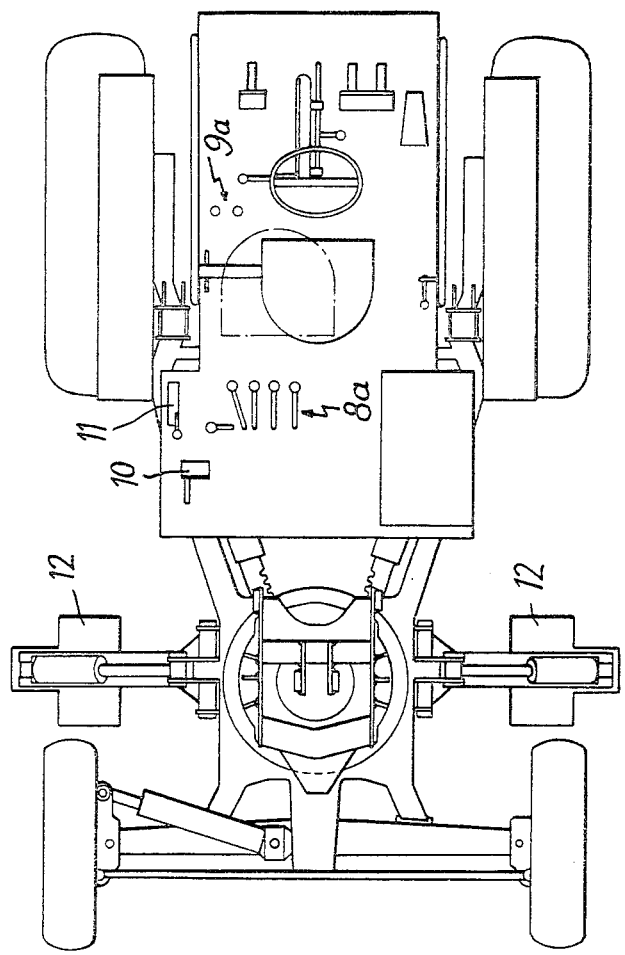
FIGURE 2 is a plan view with parts removed for the sake of clearness.

The operator's seat 6a is rotatable and movable transversely of the chassis between two different operating positions, that is between the position shown in full and chain dotted lines in FIGURE 2. The controls 8a for the earth working or excavating implement 8 are disposed on the guiding wheels side of the seat 6a and the controls 9a for the loading implement 9 are disposed on the driving wheels side of the seat and the controls 8a and 9a are offset relative to the longitudinal axis of the chassis 1.

Two set of controls for driving the machine are provided; a main set of driving controls (gear lever, clutch, brake, accelerator pedal, steering wheel etc.) being disposed on the same side of the seat 6a as the controls 9a for the loading implement 9 and a second brake 10 and clutch 11 being provided on the same side of the seat 6a as the controls 8a for the earth working or excavating implement 8.

The machine is preferably also provided in known manner with stabilisers 12 for use when necessary.

The advantages of the machine according to the present invention are that it forms a compact assembly; the weight distribution is such that the excavating or earth working implement 8 and the loading implement 9 can be operated under the best conditions; the turret operated implement 8 can be swung through a wide arc (at least 250°) and thus cover a large area to be worked without having to move the machine; the operator can drive the machine and operate all controls without having to leave his seat and furthermore the elevated position of the seat 6a gives the operator a clear view in all directions.

It will be understood that the invention is not limited to the particular details of construction herein described and illustrated but can be modified in details of construction without departing from the scope of the invention as defined in the appended claims. For example any of the well known earth working implements, grabs and the like may be substituted for the particular forms of implements 8 and 9 which have been illustrated.

What I claim is:
1. A combined earth working machine and mechanical loader comprising a chassis, a pair of large diameter driving wheels near one end of said chassis, a pair of smaller diameter guiding wheels at or near the other end of said chassis, a loading implement mounted at the end of the chassis on which said driving wheels are mounted, an excavating or earth working implement mounted on a rotatable turret at the end of the chassis on which the guiding wheels are mounted, a power unit for driving the machine and operating said implements, said power unit being located above and in general vertical alignment with the axle of said driving wheels, an operator's seat rotatably mounted on said chassis substantially above the axle of the driving wheels, controls for driving and steering the machine and controls for operating said implements, some of said controls being disposed at one side of said seat and other of said controls being disposed on the opposite side of said seat.

2. A machine according to claim 1, wherein said turret is located between the axles of said driving and guiding wheels but more closely adjacent said guiding wheels.

3. A combined earth working machine and mechanical loader comprising a chassis, a pair of large diameter driving wheels near one end of said chassis, a pair of smaller diameter guiding wheels at or near the other end of said chassis, a loading implement mounted at the end of the chassis on which said driving wheels are mounted, an excavating or earth working implement mounted on a rotatable turret situated between the driving and guiding wheels and positioned near the end of the chassis on which the guiding wheels are mounted, a power unit located above the axle of the driving wheels for driving the machine and operating said implements, an operator's seat rotatably mounted on said chassis substantially above the axle of the driving wheels, controls for driving and steering the machine and controls for operating said implements, some of said controls being disposed at one side of said seat and other of said controls being disposed on the opposite side of said seat.

4. A machine according to claim 3, wherein the controls for operating the excavating or earth working implement are disposed on the guiding-wheels side of the seat and the controls for operating the loading implement are disposed on the opposite side of the seat.

5. A machine according to claim 3, wherein two sets of controls for driving the machine are provided, one set being disposed on that side of the seat on which the controls for the earth working or excavating implement are disposed and one set on the side on which the controls for the loading implement are disposed.

6. A machine according to claim 3, wherein the controls for operating the earth working or excavating implement and the controls for operating the loading implement are offset relative to the longitudinal axis of the chassis, and the operator's seat is rotatable and movable transversely of the chassis, between two different operating positions.

7. A machine according to claim 1, wherein two sets of controls for driving the machine are provided, one set being disposed on that side of the seat on which the controls for the earth working or excavating implement are disposed and one set on the side on which the controls for the loading implement are disposed.

8. A machine according to claim 1, wherein the controls for operating the earth working or excavating implement and the controls for operating the loading implement are offset relative to the longitudinal axis of the chassis, and the operator's seat is rotatable and movable transversely of the chassis, between two different operating positions.

References Cited

UNITED STATES PATENTS

| | | |
|---|---|---|
| 2,511,692 | 6/1950 | Brown. |
| 3,101,150 | 8/1963 | Janson et al. |
| 2,992,016 | 7/1961 | Pilch _____ 214—132 |
| 3,257,013 | 6/1966 | Arnold _____ 214—131 |
| 3,339,763 | 9/1967 | Caywood et al. _____ 214—138 |

HUGO O. SCHULZ, Primary Examiner

U.S. Cl. X.R.

214—140